Aug. 17, 1937.    J. ROBINSON    2,090,359
WIRELESS SIGNALING SYSTEM FOR AIRCRAFT
Filed March 16, 1935
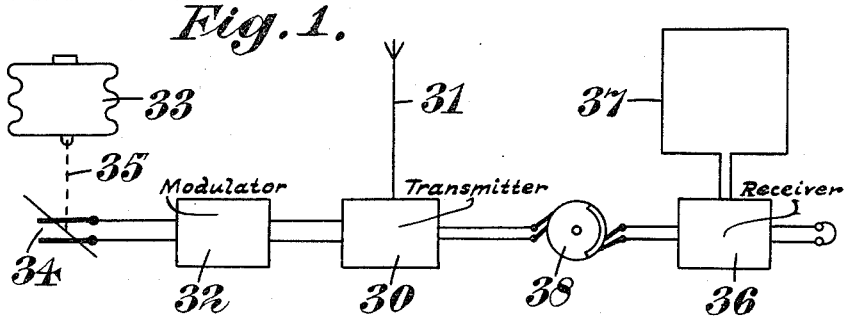
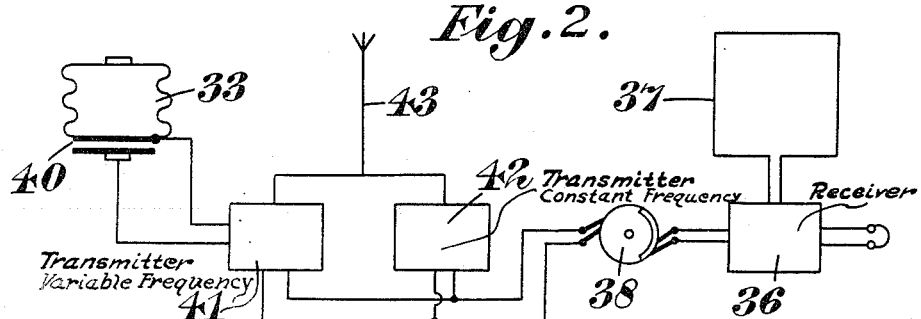

Patented Aug. 17, 1937

2,090,359

UNITED STATES PATENT OFFICE 2,090,359

WIRELESS SIGNALING SYSTEM FOR AIRCRAFT

James Robinson, London, England

Application March 16, 1935, Serial No. 11,491
In Great Britain March 20, 1934

6 Claims. (Cl. 250—1)

It is desirable that in conditions of low visibility the pilot of an aircraft should receive warning of his proximity to other aircraft or to selected places, such as aerodromes, or to obstacles, such as mountains, and also in some instances should give a warning of his approach, and the object of this invention is to provide a wireless signaling system which, whilst giving such a warning, will also give to a pilot an indication of his height relatively to that of another station, whether such station be another aircraft, an aerodrome or an obstacle such as a mountain peak. In some cases, it will be sufficient to know merely that his height is different, in other cases he will wish to know whether he is above or below the other station, and in yet other cases he will want to know of his gradual approach to it.

The barometrically-controlled altimeters now in use on aircraft do not give all this desired information and moreover may even give misleading indication insofar as the actual atmospheric pressure may change during a flight, or the aircraft may travel from a region of one atmospheric pressure to a region in which a different atmospheric pressure exists.

According to this invention, there is provided for use in wireless signaling systems for aircraft apparatus comprising a transmitter for wireless signals, means for controlling a frequency of the transmitted signals, such as a modulation frequency according to the ambient atmospheric pressure at the transmitter, means for receiving like signals from another station and means for comparing an indication of the barometric pressure corresponding to the transmitted signals with an indication of the barometric pressure corresponding to the received signals.

Thus the pilot of the aircraft is provided with an indication of his height relative to the height of the transmitter of the signals he receives such as to enable him according to one use of the invention to avoid collision with another aircraft or other object carrying apparatus similar to his own.

It is preferred to provide automatic means to render the transmitting and receiving apparatus at the station alternately operative.

The invention also comprises varying the transmitting frequency non-linearly with respect to the barometric pressure and alternatively or in addition, repeating a given range of transmission frequencies for different ranges of height, e. g., under the control of the barometric device.

In the accompanying drawing, illustrating embodiments of the invention diagrammatically and by way of example:—

Figure 1 shows a transmitting and receiving apparatus primarily for the use on aircraft, and Figure 2 shows another form of such apparatus.

In the arrangement shown in Figure 1 there is provided on the aircraft a transmitter 30 energizing an aerial 31 which is conveniently non-directional and the transmitter 30 is modulated at 32 by a frequency varying for instance in the audible range under the control of a barometric device 33. The modulation frequency is controlled in this instance by means of a variable condenser 34 operated through a linkage indicated at 35 by the barometric device 33 so that the modulation frequency is varied either directly or in some other ratio according to the atmospheric pressure. The linkage indicated at 35 may, for instance, be a mechanical linkage.

Associated with this transmitter there is provided a receiver indicated at 36 having an aerial 37 which is conveniently of the directional form so as to give an indication of the direction of the transmitter of the received signals. The receiver is tuned to the carrier frequency adopted for the transmitter 30. The transmitter 30 and the receiver 36 are controlled so as to be alternatively operative for short periods by means, such as a commutator device indicated at 38.

In operation of the apparatus on an aircraft the transmitter is adjusted as regards the modulation frequency to a given datum preferably with respect to absolute atmospheric pressure so that any two transmitters at the same height and in the same vicinity will transmit the same modulation frequency. The receiver and the transmitter operate alternately so that during the reception periods the presence of another similarly equipped aircraft in the vicinity and its height are shown by the signals received. According to one means of producing the required comparison, the commutator device 38 is such as to permit some of the energy from the associated transmitter to be picked up by the receiver so that the operator is enabled to make a comparison between the signals given out by his own apparatus and those received from the other aircraft. The rates of such alternations are preferably fortuitous, but may be controlled if desired.

Aerodromes or other important locations on the ground may also be equipped with the combined transmitting and receiving apparatus as shown in Figure 1, for instance in order to assist the landing of an aircraft under conditions of poor visibility, and in order to distinguish such a station an additional characteristic signal may be provided by the transmitter.

By setting the apparatus according to some value of absolute pressure similarly calibrated apparatus in the same locality will give the same signal so that the system is independent of natural barometric changes.

The embodiment shown in Figure 2 is similar to that of Figure 1 and the barometric device 33 is shown as directly controlling a variable condenser 40 connected in a circuit of a transmitter 41 in order to vary the frequency according to barometric pressure. An additional transmitter 42 is provided of constant frequency different from the range of the frequencies of the transmitter 41. Both transmitters serve to energize an aerial 43. A receiver 36 having an aerial 37 is provided as in Figure 1 and the receiver and the two aerials are similarly controlled so as to be alternately operative by means of a commutator 38. With this form of apparatus the transmitter emits two frequencies one of which is constant and the other of which varies in frequency according to barometric pressure so that the receiver of another similar installation which must be broadly tuned for the range of frequencies required provides a beat-note response which varies in frequency, according to the height of the transmitter as in the preceding case described with reference to Figure 1. A powerful transmitter of the constant frequency may be employed in conjunction with a plurality of transmitters of lower power for the variable frequency and distributed over a wide area.

Warning signals such as are provided by this invention are especially required within a few thousand feet of ground level and therefore it is convenient to vary the frequency widely with respect to altitude up to say 5,000 feet and to provide a lesser variation of frequency for altitude differences at higher altitudes. For example, this may be effected by suitably selecting the law according to which the condenser 34 is constructed.

The output of the receiver may be used to provide an aural or a visual indication or both and means may also be provided for recording the reception of warning signals. It will, of course, be essential for the transmitted frequencies to be the same and controlled in the same manner by the barometric device for all aircraft using this system and therefore no tuning of the apparatus other than its original setting is necessary.

I claim:—

1. For use in wireless signaling systems for aircraft, a transmitting and receiving station comprising in combination a transmitter for wireless signals, means for varying a frequency of the transmitted signals according to the ambient atmospheric pressure at the transmitter, a receiver for incoming signals from a distant transmitting means, which signals vary in frequency in accordance with the atmospheric pressure at the location of said distant transmitting means, means for rendering the said transmitter and said receiver alternately operative, and means at said station for comparing an indication of the barometric pressure corresponding to the signals of said transmitter with an indication of the barometric pressure corresponding to the signals received from said distant transmitting means.

2. For use in wireless signaling systems for aircraft, a transmitting and receiving station comprising in combination a transmitter for modulated carrier-wave signals, means for varying a modulation frequency of the transmitted signals according to the ambient atmospheric pressure at the transmitter, a receiver for incoming signals from a distant transmitting means, which signals vary in frequency in accordance with the atmospheric pressure at the location of said distant transmitting means, means for rendering the said transmitter and receiver alternately operative, and means at said station for comparing an indication of the barometric pressure corresponding to the signals of said transmitter with an indication of the barometric pressure corresponding to the signals received from said distant transmitting means.

3. For use in wireless signaling systems for aircraft, a transmitting and receiving station comprising in combination a transmitter for wireless signals, a barometric device, means controlled by said barometric device to vary a frequency of the transmitted signals non-linearly with respect to atmospheric pressure such that a wider difference in frequency is provided for equal pressure differences at the lower altitude end of the pressure range than at the higher altitude end of this range, means for receiving incoming signals from a distant transmitting means, which signals vary in frequency in accordance with the atmospheric pressure at the location of said distant transmitting means, means for rendering said transmitter and receiver alternately operative, and means at said station for comparing an indication of the barometric pressure corresponding to the transmitted signals with an indication of the barometric pressure corresponding to the received signals.

4. For use in wireless signaling systems for aircraft, a transmitting and receiving station comprising in combination a transmitter for carrier-wave signals, a barometric device, means for varying the carrier-frequency of the transmitted signals according to the ambient atmospheric pressure, a second transmitter of constant frequency whereby the signals on reception provide a beat note varying in frequency according to the barometric pressure, a receiver for incoming signals from a distant transmitting means comprising a constant frequency and a frequency varying with the atmospheric pressure at the location of said distant transmitting means, said receiver having means combining the carrier-wave of varying frequency with the carrier-wave of constant frequency to produce the said beat note, means for rendering said transmitters and said receiver alternately operative, and means at said station for comparing an indication of the barometric pressure corresponding to the transmitted signals with an indication of the barometric pressure corresponding to the received signals.

5. For use in wireless signaling systems for aircraft, apparatus comprising in combination a transmitter for wireless signals, means for varying a frequency of the transmitted signals according to the ambient atmospheric pressure at the transmitter, a receiver for incoming signals from a distant transmitting means which vary in frequency in accordance with the atmospheric pressure at the location of said distant transmitting means, and automatic means for rendering the said transmitter and receiver alternately operative.

6. For use in wireless signaling systems for aircraft, a transmitting and receiving station comprising in combination a transmitter for wireless signals, means for varying a frequency of the transmitted signals according to the ambient atmospheric pressure at the transmitter, a receiver for incoming signals from a distant transmitting means which signals vary in frequency in accordance with the atmospheric pressure at the location of said distant transmitting means, means for rendering the said transmitter and said receiver alternately operative, and means affording an indication of the barometric pressure corresponding to the signals delivered by said transmitter and an indication of the barometric pressure corresponding to the received signals from said distant transmitting means, whereby said indications may be compared.

JAMES ROBINSON.